United States Patent [19]

Joug

[11] Patent Number: 5,174,613
[45] Date of Patent: Dec. 29, 1992

[54] KIT FOR CONSTRUCTING AN EXPANSION JOINT FOR JOINING PIPES

[75] Inventor: Roland Joug, Plaisir, France

[73] Assignee: Caoutchouc Manufacture et Plastiques S.A., Versailles, France

[21] Appl. No.: 652,085

[22] Filed: Feb. 7, 1991

[30] Foreign Application Priority Data

Feb. 7, 1990 [FR] France ................. 90 01495

[51] Int. Cl.⁵ .......................................... F16L 23/02
[52] U.S. Cl. .................................. 285/229; 285/405; 285/200; 285/298
[58] Field of Search ............. 285/200, 208, 213, 214, 285/4, 162, 223, 226, 229, 405, 423, 921, 298; 174/153 G; 29/512, 513

[56] References Cited

U.S. PATENT DOCUMENTS

| | | | |
|---|---|---|---|
| 2,710,630 | 6/1955 | Greer | 285/208 |
| 4,726,609 | 2/1988 | Daignon et al. | |
| 4,749,216 | 6/1988 | Bechu et al. | |
| 4,750,763 | 6/1968 | Bechu | |

FOREIGN PATENT DOCUMENTS

| | | | |
|---|---|---|---|
| 0196954 | 3/1986 | European Pat. Off. | |
| 0202131 | 3/1986 | European Pat. Off. | |
| 0207813 | 1/1987 | European Pat. Off. | |
| 2606180 | 8/1977 | Fed. Rep. of Germany | 285/229 |
| 2629348 | 1/1978 | Fed. Rep. of Germany | 285/229 |
| 2638622 | 3/1978 | Fed. Rep. of Germany | 285/229 |
| 2006730 | 1/1970 | France | |
| 7003317 | 11/1970 | France | |
| 7202268 | 9/1972 | France | |
| 7523512 | 2/1976 | France | |
| 8001742 | 8/1980 | France | |
| 1315710 | 6/1987 | U.S.S.R. | 285/208 |

OTHER PUBLICATIONS

New maxi-sphere expansion joints; General Rubber Corp. 4 pages.
Information Stenflex brochure; Stenflex S.A.R.l. brochure "Pour plus de securité dans vos tuyauteries", 2 pages.
Dilatoflex K; K Kleber Industrie brochure, 8 pages.
"Suction and Discharge Hose Assemblies for Highly Abrasive Materials"; Kleber Industrie brochure, 8 pages.

*Primary Examiner*—Eric K. Nicholson
*Attorney, Agent, or Firm*—Nils H. Ljungman and Associates

[57] ABSTRACT

A kit for constructing an expansion joint for pipes includes a flexible sleeve and at least one flange, the sleeve for being anchored to the flange by a reinforcement bead of the sleeve which reinforcement head includes an articulated chain of interconnecting elements disposed within the bead, the interconnecting elements being rotatable about one another on an axis of rotation which is substantially parallel to the longitudinal axis of the flexible sleeve.

17 Claims, 8 Drawing Sheets

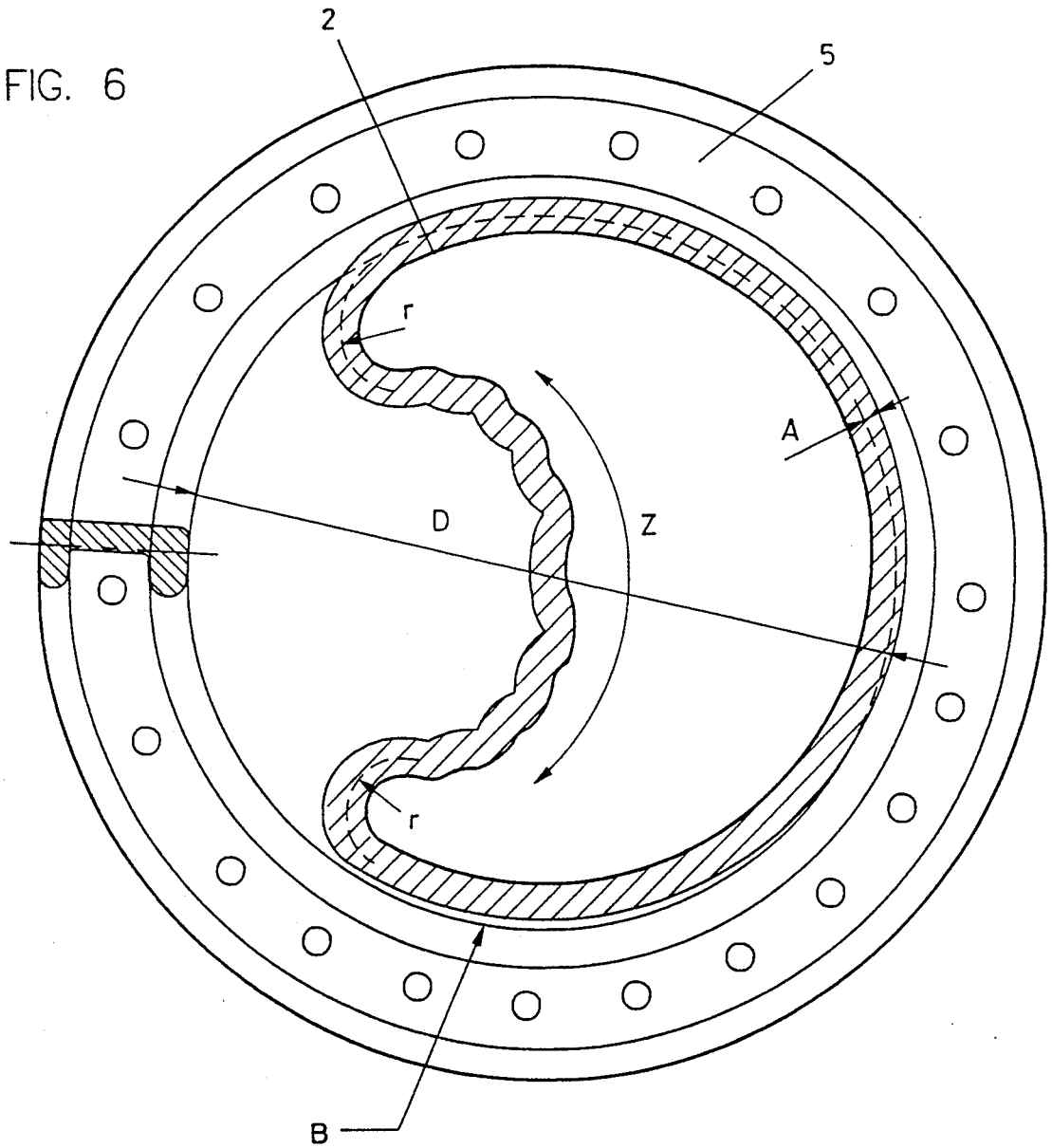

KIT FOR CONSTRUCTING AN EXPANSION JOINT FOR JOINING PIPES

BACKGROUND OF THE INVENTION

1. Field of the Invention

This invention relates to a kit for the construction of a pipe expansion joint, a pipe expansion joint and a system for anchoring traction elements of a flexible, tubular structure in the opening of a flange or rigid wall, in which the anchoring is caused by axial contact of a shoulder of the traction element with the flange or rigid wall after passage of the traction element through the opening made in the rigid wall. To simplify the description of the invention, the term "sleeve" will be used to define the flexible tubular structure, and the term "bead" will be used to define the extremity or traction device of the sleeve, which extremity has a diameter greater than the diameter of the sleeve, and which extremity makes contact with the rigid wall. The rigid wall will be designated by the term "counterflange".

2. Background Information

The known art includes sleeves having a flexible bead, in which the bead generally includes an internal armature that may be embedded in the material of the sleeve. This armature may be in the shape of a ring, and may consist of: rubber with a high modulus of elasticity, a strip of textile, a textile or metal strand or even a flexible spring. This type of reinforcement is adopted to make the bead deformable so that the bead can be forced through the smaller diameter hole of the counterflanges, to thus allow the counterflanges to be put onto the sleeve after the sleeve is fabricated. The major disadvantage of these systems is the necessity for pinching a flat counterflange between two planes, or in the use of a shaped counterflange, obtained by machining, so that a rigid part of the counterflange comes into contact against an inside diameter of this deformable bead as, for example, in the pneumatic suspension membranes described in French Patent No. 2 127 561 to Continental Gummi-Werke Aktiengesellschaft, or in the expansion compensation sleeves described in French Patents Nos. 2 280 853 to Barghofer, 2 033 789 to Pirelli Societa Per Azioni, or 2 006 730 to Continental Gummi-Werke Aktiengesellschaft.

These systems of sleeves, which have flexible beads, therefore require assembly techniques which frequently cause a high concentration of stresses at the extremity of the counterflange, which stresses can damage or even destroy the seal. Therefore, conventional sleeves with flexible beads can only be used for moderate service pressures. To eliminate these disadvantages, rigid beads having a large contact surface with the flange have been proposed. This is the solution adopted by Kleber Industrie for its integrated tube flanges, which it markets under the trade name Endlfex System (described in the Kleber Industrie Performer AD 10 Hose Catalogue, Page 4), or its Dilatoflex K expansion sleeves described in the Kleber Industrie Catalogue FC175-18, dated Jun. 1984. these devices all have a high rigidity and are most frequently made with metal components. As a result of their design, the rubber is compressed over a large contact surface, which improves the distribution of stresses and reduces the creep sensitivity of the rubber, thereby providing a better seal and allowing the device to be used at high service pressures.

On the other hand. on account of their rigidity, these beads have the disadvantage that they prevent the assembly of one-piece counterflanges to the sleeve after the sleeve is fabricated. It is therefore necessary to proceed with the assembly of the counterflanges to the sleeves during production of the sleeves, thus, making it necessary to vulcanize the sleeve after the sleeve is equipped with its metal parts, which metal parts add significantly to the weight and volume of the sleeve, thus making the sleeve more difficult to handle.

In addition, the counterflanges, when put on during the production of the sleeves, are no longer removable, as indicated by the Stenflex catalogue No. 2 of Jun. 1984, and the General Rubber corporation catalogue. The manufacturer or supplier of the sleeves must, therefore, maintain a large inventory of a wide variety of sleeves so that sleeves equipped with flanges, which flanges match all of the various standardized connections, are always available.

A sleeve with removable flanges is described in French Patent No. 2 447 512 to Rudolf Stender, but the beads are rigid and have reinforcement collars which are separate from the sleeve. The proposed solution, which consists of surrounding the collar with a U-shaped rubber piece, requires the realization of a very complex mold for the formation of the sleeve.

As a result of the above analysis, Caoutchouc Manufacture et Plastiques developed a sleeve in which the rigid armature constituting the shoulder becomes rigid after passage of the armature through the opening of the wall of the counterflange. The three patents, European Patent No. 0 196 954 to Roux et al., European Patent No. 0 202 131 to Bechu et al., and European Patent No. 0 207 813 to Bechu et al., have been issued for various features relating to this sleeve. The armatures of the sleeves described in these three patents can be fitted through the opening of the flange by bending the armatures in the axial direction of the sleeve. The armatures themselves can generally be constructed as one-piece armatures which can either be split mechanically or fragmented into smaller individual elements, or the armature may be constructed of individual elements which are connected to a flexible connection element.

These three variants describe an armature whose components differ from one another, but, which armatures, in each case, allow for bending of the armature in the axial direction, i.e., around convergent radial axes. In this operation, a number of sectors of the armature, i.e., two or three, are pressed back toward the rear of the sleeve, which allows the opposite sectors to be folded toward the front, until they are engaged in the hole of the counterflange. This operation, which is difficult to automate, but which has advantages such as a reduction in the size of the inventory of both counterflanges and sleeves of the various types which must be maintained, is necessary to meet the demand for a large variety of combinations. These armatures can even be used effectively on small-diameter sleeves, which, for the expansion joint industry, means nominal diameters of less than 400 mm of exposed cross section.

OBJECT OF THE INVENTION

The present invention proposes a kit for the construction of a flexible sleeve, which flexible sleeve has a flexible bead which has a mode of deformation in a single plane. This flexible bead can be used for flexible tubular sleeve of large dimensions, and combines the advantages of the different types of flexible beads of the known art, substantially without any of their disadvantages.

SUMMARY OF THE INVENTION

The present invention utilizes a bead which has an endless chain of interconnected individual elements as its reinforcement armature, wherein the chain is articulated in a single plane such that the rotation between any two adjacent pieces of the chain is about an axis parallel to the axis of the sleeve. The mode of deformation of the chain is appropriately described by the expression "shaping into a form resembling kidney bean". This deformation allows a bead having such an articulated assembly of sufficiently numerous elements of significant width to pass through the opening of a counterflange without undue deterioration of the walls of the bead. Also, this bead structure is preferably sufficiently sturdy to provide an efficient seal after the bead resumes its original circular shape.

The invention essentially consists of an articulated reinforcement armature for the reinforcement bead of a flexible tubular structure, which reinforcement bead can be anchored to the opening of a rigid wall or to a rotatable counterflange.

The invention is characterized by the fact that the reinforcement armature consists of an endless chain of flat, individual elements which articulate about axes parallel to the axis of the flexible tubular sleeve. The chain is embedded in the flexible, elastomer compound wall of the reinforcement bead, and thus, allows the reinforcement bead to assume a "kidney" shape so that the bead can be pushed through the hole of the rigid wall or the rigid counterflange without adversely affecting the radial anchoring strength of the bead after it returns to its original circular shape.

One aspect of the invention resides broadly in a kit for making a pipe expansion joint, the kit including a flexible sleeve having a longitudinal axis and at least one flange for being disposed about the sleeve, the at least one flange having an orifice portion, the orifice portion having an orifice, and the orifice having an internal dimension. The sleeve further comprises an anchoring device for anchoring the sleeve to the at least one flange, the anchoring device being a shoulder portion of the sleeve, and the shoulder portion having an external dimension which is greater than the internal dimension of the orifice of the at least one flange. The shoulder portion is further made up of a plurality of adjacent, interconnecting elements, each of which interconnecting elements are rotatably connected by a device for providing rotation to their adjacent elements so that an axis of rotation of any two adjacent elements is parallel to the longitudinal axis of the sleeve, and the interconnecting elements, the device for providing rotation, and the shoulder portion are configured to permit angular movement between the interconnecting elements about their corresponding axes of rotation and thus decrease the external dimension of the shoulder portion to thereby permit insertion of the shoulder portion through the orifice of the flange.

Another aspect of the invention resides broadly in a flexible sleeve for a pipe expansion joint, the flexible sleeve for being disposed within an orifice of at least one flange, the orifice having an internal dimension and the flexible sleeve having a longitudinal axis, the flexible sleeve comprising an anchoring device for anchoring the flexible sleeve to the at least one flange. The anchoring device further comprising a shoulder portion of the sleeve, the shoulder portion having an external dimension which external dimension is greater than the internal dimension of the orifice of the at least one flange. The shoulder portion is further made up of a plurality of adjacent, interconnecting elements, each of which interconnecting elements are rotatably connected by a device for providing rotation to their adjacent elements so that an axis of rotation of any two adjacent elements is parallel to the longitudinal axis of the sleeve, and the interconnecting elements, the device for providing rotation, and the shoulder portion are configured to permit angular movement between the interconnecting elements about their corresponding axes of rotation and thus decrease the external dimension of the shoulder portion to thereby permit insertion of the shoulder portion through the orifice of the flange.

An additional aspect of the invention resides broadly in an anchoring device for anchoring a flexible sleeve of an expansion pipe joint to at least one flange, the flexible sleeve having a longitudinal axis and the at least one flange having an orifice portion, the orifice portion comprising an orifice having an internal dimension, and the anchoring device comprising a shoulder portion of the flexible sleeve, the shoulder portion having an external dimension, which external dimension is greater than the internal dimension of the orifice of the at least one flange. The shoulder portion is further made up of a plurality of adjacent, interconnecting elements, each of which interconnecting elements are rotatably connected by a device for providing rotation to their adjacent elements so that an axis of rotation of any two adjacent elements is parallel to the longitudinal axis of the sleeve, and the interconnecting elements, the device for providing rotation, and the shoulder portion are configured to permit angular movement between the interconnecting elements about their corresponding axes of rotation and thus decrease the external dimension of the shoulder portion to thereby permit insertion of the shoulder portion through the orifice of the flange.

BRIEF DESCRIPTION OF THE DRAWINGS

The characteristics and variants of the invention are described in greater detail below, with reference to the accompanying drawings:

FIG. 6 shows, in a view along the central axis of the sleeve, the deformation necessary for the assembly of the sleeve and the counterflange;

FIG. 8b shows the composition of a fabricated flat sleeve in sectional view along the Plane Q of FIG. 8a;

DESCRIPTION OF THE PREFERRED EMBODIMENTS

Figure 1:
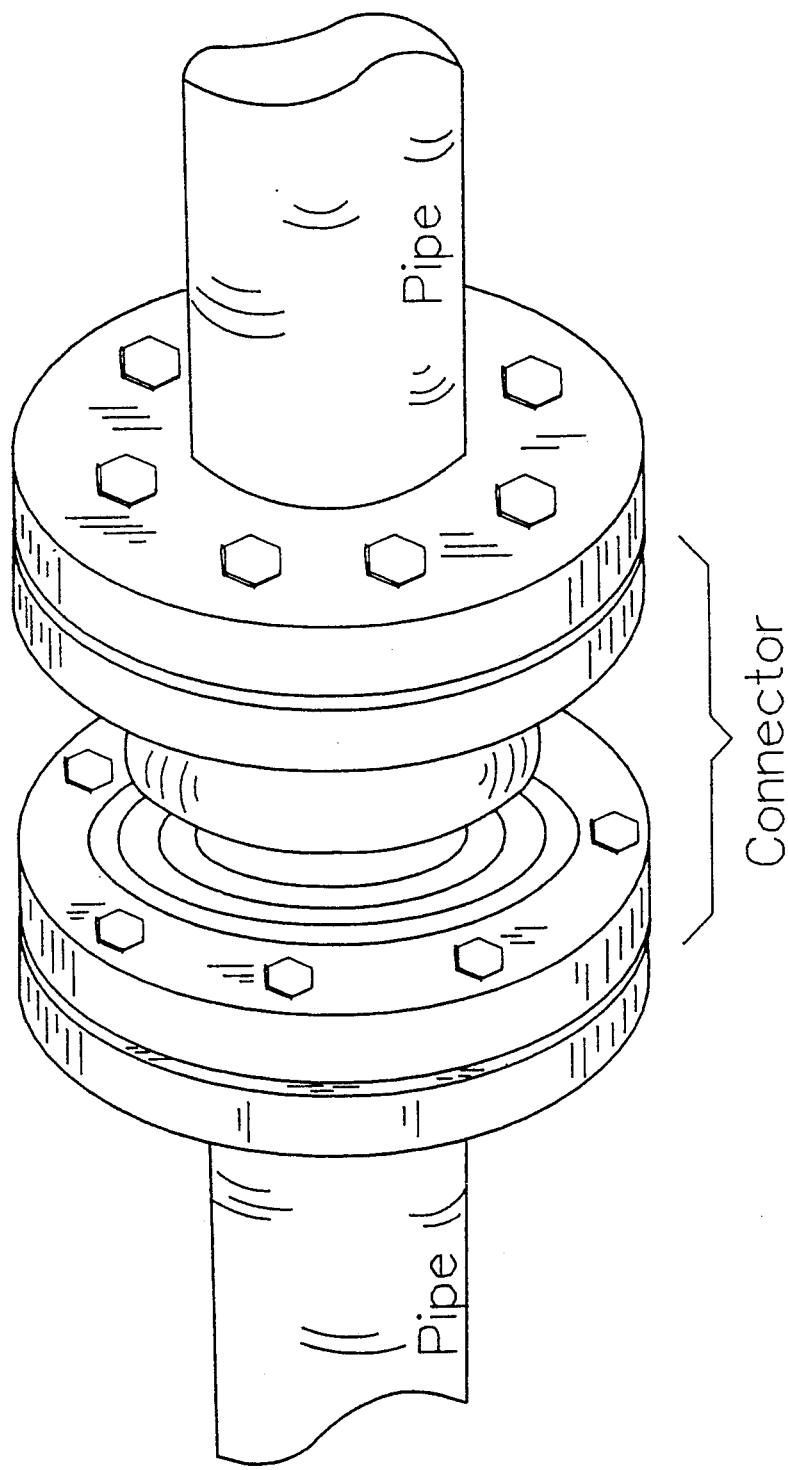
FIG. 1 shows a flexible connector connecting two pipe segments.
Figure 2:
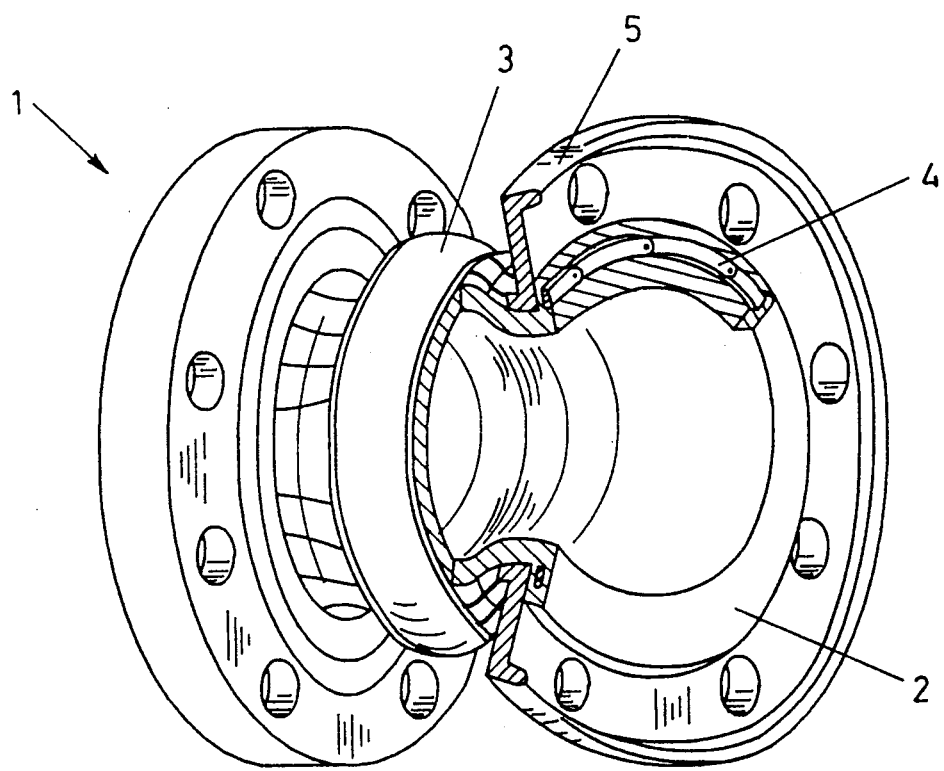
FIG. 2 is a partial cut away view of the connector of FIG. 1.

FIG. 1 shows a type of flexible connector connecting two pieces of pipe together. Such a flexible connector can be used for pipes carrying fluids under pressure, and the material of the connector can be varied for use in carrying various fluids. The connector is shown in greater detail in partially cut away view in FIG. 2 and in partial cross section through the diameter in FIG. 3.

The flexible connector or expansion sleeve 1 has essentially three parts, the flexible wall 3, the reinforcement bead 2, and the counterflange 5. The flexible wall 3 preferably comprises a network of textile or metal cords 7 embedded within an elastomer compound 6. These textile or metal cords generally pass the full length of the sleeve, and wrap around a reinforcement armature 4 embedded within the reinforcement bead 2. With this construction, the reinforcement bead 2 anchors the sleeve 1 to the counterflange 5 by means of the reinforcement armature 4 and by clamping pressure provided on the fastening plane P by means of the rigid counterflange 5. The upward portion 8 of this corded structure generally comprises an even number of symmetrically-oriented plies behind the reinforcement armature 4. By pinching the extremities of the wires of this network of cords 7 between the counterflange 5 and a flange of an adjacent pipe segment (not shown), when the counterflange 5 is fastened to the flange of the adjacent pipe segment, a positive anchoring is provided in response to radial forces which can be so great that they can rupture these cords.

Such an anchoring is made possible, after the reinforcement armature 4 resumes its circular shape, by the circumferential compression strength, under the possible action of a centripetal force of this reinforcement armature 4. For the passage of the bead through the counterflange hole, as is necessary for assembly, the reinforcement armature 4 can be flexed so as to form a double curve, which shape may be described as the shape of a kidney.

Figure 4:
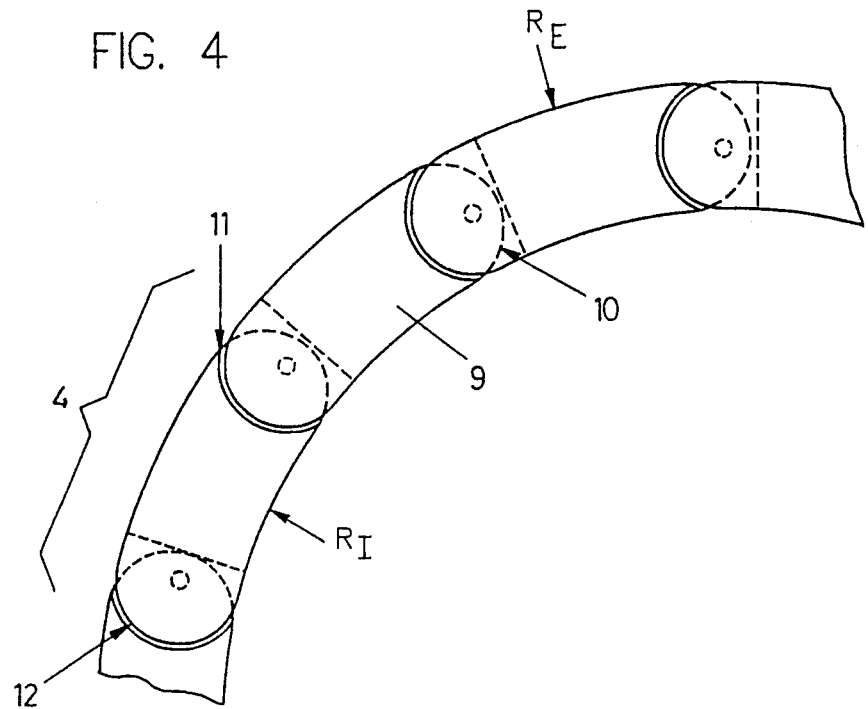
FIG. 4 is a plan view of the articulated armature assembly before incorporation of the armature into a reinforcement bead.

FIG. 4 is a plan view showing the structure of a reinforcement armature 4 according to the invention. This reinforcement armature 4 comprises a suitable number of individual elements 9 preferably interleaved in one another to constitute an endless chain. The external or overall shape of the assembled chain is very close to that of the flat rigid ring, used, for example, in the known art as a bead reinforcement for a flexible expansion sleeve.

An individual element 9 of the reinforcement armature preferably has the appearance of a plate, preferably with parallel sides cut into the shape of circular sectors having an outside average radius RE and an inside average radius RI. A number of individual elements, e.g., in the number of 36 or 40 or thereabouts, are then selected to form, preferably, a complete circle. In this manner, an essentially circular reinforcement armature can also be made into a polygon shaped armature, having a different number, higher or lower by several units, of beads of different nominal diameters, to thus provide a range of sizes of flexible tubular structures. Each male end 10 and each female end 11 preferably have curved surface 12 which has the same curvature. And thus, by inserting one male end 10 of a first element into a female end 11 of an adjacent element, it is possible to construct a rigid, quasi-circular ring having a substantially constant cross section, which ring can be used as a reinforcement armature for the bead of a flexible tubular structure over a major portion of the range of sizes of flexible tubular structure that are needed.

In the large diameter sleeves of the metric series, i.e., sleeves having a diameter greater than 1000 mm, the nominal sleeve diameters are most frequently graduated in steps of 100 mm, and for applications having diameters between 400 and 1000 mm the diameters are usually graduated in steps of 50 mm.

In practice, the perimeters of the rigid rings that make up the reinforcement armatures 4 differ from one another, e.g., they may have differences in perimeters of 320 mm and 160 mm. The length of the individual elements 9 is then preferably selected as a sub-multiple of these lengths, e.g., 40 mm, and thus, the reinforcement armatures of these two sizes will differ by four individual elements. Consequently, a series of armatures having 32 - 36 - 40 - 44 - 48 individual elements is one way to set up a range of reinforcement armatures made from the same individual elements 9. The average radii RE and RI of the individual elements 9 preferably correspond to a perfect circle for the armature having 40 elements and to a slightly different polygon shape for the armatures having the other number of individual elements.

Figure 5A:
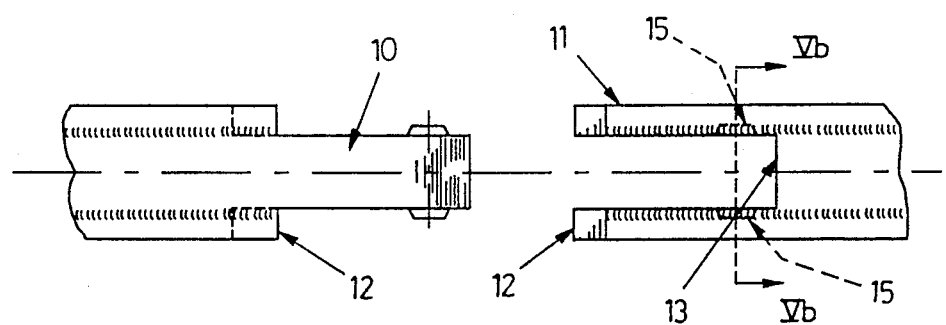
FIG. 5a shows two individual elements of the articulated assembly in plan view before they are joined together.

FIG. 5a, a side view before assembly of the elements 9, shows that the contact between one male extremity 10 and one female extremity 11 preferably takes place at all points along curved surfaces 12 which come into contact during the radial compression of the ring forming the reinforcement armature. At the base of the connection 13, the elastomer compound, of which the wall of the reinforcement bead is made, can be introduced under pressure during the vulcanization of the flexible tubular structure in a mold.

Because of the curved shape of the curved surfaces 12, the cords of the network, e.g., made of high-strength textile, which are folded back above the reinforcement armature during fabrication, preferably do not encounter any gap in the surface in which they could be pinched. Such a pinching would possibly result in a disadvantageous localization of stresses during alternating fatigue tension cycles.

Figure 5B:
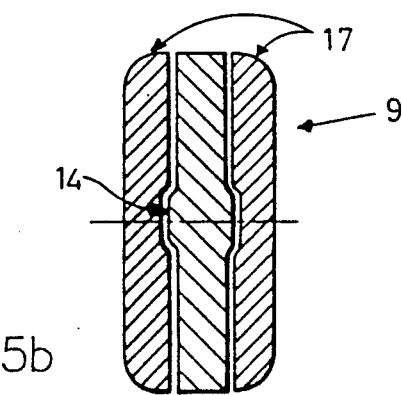
FIG. 5b shows a cross sectional view of two individual elements along line "Vb" of FIG. 5a after the elements are joined together.

FIG. 5b shows a cross section of two "clipped together" elements taken along a line as shown as "Vb" in FIG. 5a. This cross-section is usually valid for the entire cross section of a reinforcement armature. The corners 17 of the elements 9 are preferably rounded to allow for the above-mentioned folding back of the cords of the network.

The individual elements 9 can preferably be made either of steel castings or aluminum castings in order to obtain a certain precision in the male-female connection, and a hole can then be drilled at the center of curvature of the curved surfaces 12, so that a shaft can be inserted through the elements 9 to hold the elements 9 together and to provide an axis of articulation between any two adjacent elements 9.

In an alternative embodiment, even more advantageously, the individual elements can be made of a rigid polymer, which polymer may preferably be reinforced if necessary, e.g., with glass fibers. These elements can have bosses 14 on the male end 10 and associated dimples 15 on the female end 11 for receipt of the bosses 14. The rigid polymer gives the elements 9 some deformability, which makes it possible to force the male end 10 into the female end 11. Thus, a chain of elements 9 can be made by "clipping" the individual elements 9 together, to thus form the reinforcement armature 4 which can be handled easily.

The different diameters of flexible tubular structures, using a reinforcement armature 4 having identical individual elements, makes it possible to mass produce the flexible tubular structures with a satisfactory geometric precision.

FIG. 6 is a view along the central longitudinal axis of the sleeve, showing the deformation experienced by a reinforcement bead 2 made according to the invention during the introduction of the reinforcement bead 2 into the hole of the rigid counterflange 5. In terms of sample dimensions, the operation relates to the passage of an outside bead having an external diameter of about 1091 mm, through a hole having an external diameter of about 1025 mm, for a flexible tubular structure with a nominal internal diameter of about 1000 mm.

It should be noted that the throat which follows the bead is used on side A for an oblique engagement of the reinforcement bead 2 in the hole of diameter D. The size reduction, which makes it possible to engage the reinforcement bead 2 on the second size B slightly obliquely, requires only the dimension D+(one bead thickness), which advantageously limits the necessary deformation, in particular in the zones bent to an average radius r. Although contained strictly in one plane, the elastic deformation of the reinforcement bead 2 allows portions of the reinforcement bead 2, by sufficiently releasing its outside edge for passage in the hole D, to have a change of average radius from the initial radius (RE+RI)/2 at rest, to a radius four times smaller than the initial radius, that is radius r, when the reinforcement bead 2 is maximally distorted. In other words, the angle that is formed between the axes of the engaged adjacent individual elements, which angle at rest (when the armature is circular) is on the order of 9 to 10 degrees, is multiplied by as much as four, or thereabout, during the temporary deformation of the armature in the deformed zone which has an average radius r.

The deformation exerted on the layers of armature cords surrounding the individual elements remains on the same order of magnitude as applied, but it is applied in the opposite direction in the reverse curvature zone Z which falls between the two average radii zones r. In other words, the deformation compression is applied inside in the zone bent at an average radius r and outside for the reverse curvature zone Z. Rotation between individual elements risk compressing or even clipping of the armature cables when the angle formed is on the order of 27 to 30 degrees, which range usually constitutes the allowable limit of deformation. Also, by varying the number of individual elements 9 to from armatures of different sizes, the radius r can be made smaller or larger.

Outside the sleeve in the zone bent at the average radius r, and inside the sleeve in the reverse curvature zone Z, the armature cords risk being extended, but preferably appropriately, they have already been spread apart by the spreading of the layers, which layers are adjacent only over the nominal diameter of the flexible tubular structure.

Figure 7A:
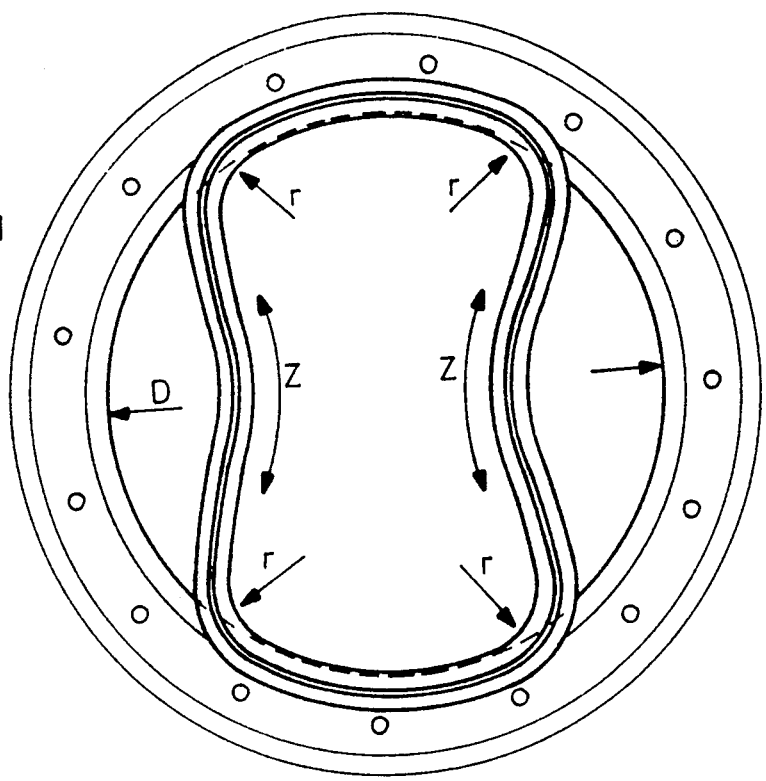
FIG. 7a, 7b, and 7c show other possible types of deformations for the assembly of the sleeve and the counterflange.
Figure 7B:
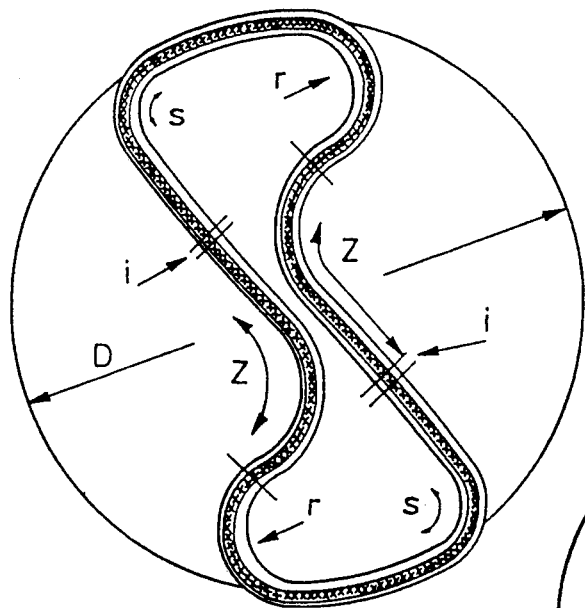
Figure 7C:
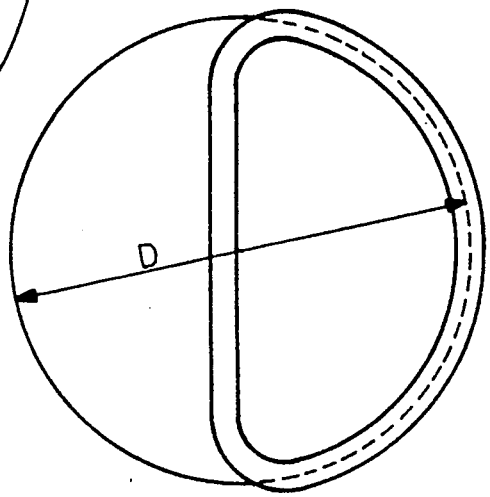

Under the same conditions as in the immediately preceding figure, FIGS. 7a, 7b, and 7c show examples of other types of deformations which can be utilized for the same purpose, which deformations are a function of the inherent or natural rigidities of the beads of the flexible tubular structures reinforced with the armature of the type of the present invention.

FIG. 7a illustrates an armature deformation having two axes of symmetry, in which the perimeter of the reinforcement bead essentially assumes what may be termed an "hourglass" shape. This configuration has four zones with an average radius r, which radius has been reduced to a value near D/8. Two zones of reverse curvature Z, which are adjacent to the zones of radius r, force the relative rotations of the individual elements so that the armature returns back to its original circular configuration.

FIG. 7b is a variant of the preceding configuration, where a minimum asymmetry of the average radii r makes it possible for two less-curved zones s to be juxtaposed with two short zones of reverse curvature Z. An inflection zones i separates a less-curved zone s and a zone of reverse curvature Z, and the reverse curvature zones Z are brought into contact with one another near these inflection zones i.

The choice among the different deformation possibilities can be made experimentally, as a function of the elasticity of the cables enveloping the reinforcement armature. The elasticity will favor one or the other of the flexures from an average radius D/2 at rest to D/8 or even D/10 in one direction, and toward approximately $-D$ in the other direction, which is usually the most destructive case.

FIG. 7c shows the result of a theoretical curve calculation. From an average radius D/2 at rest, the reinforcement armature of a bead undergoes the same rotation, but in the reverse direction, attaining an average radius D/10, so as to arrive at an alignment of the individual elements. To re-establish the initial perimeter, a zone of reverse curvature would be necessary during a short-term dynamic maneuver.

Figure 8A:
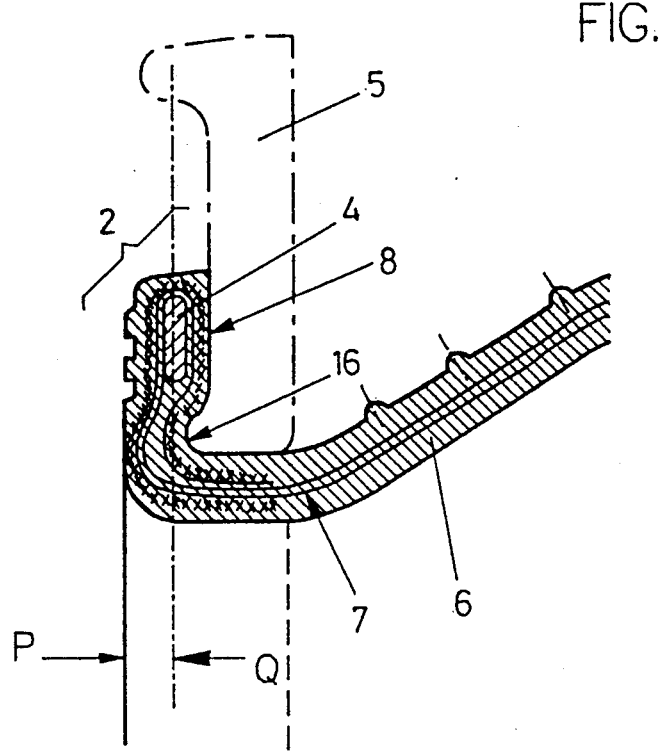
FIG. 8a shows a cross sectional view of the expansion sleeve similar to the view of FIG. 3.
Figure 8B:
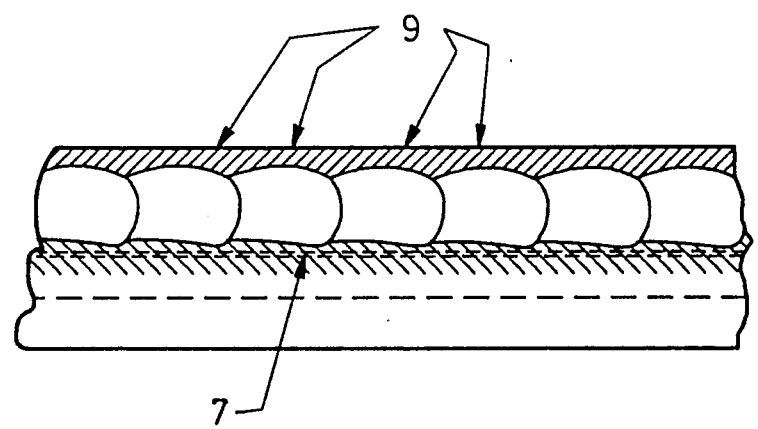

FIGS. 8a and 8b illustrate an advantageously possible extension of flexible tubular structures toward very large diameters, i.e., beyond nominal diameters of about 1000 mm, by using the configuration of reinforcement armatures comprising individual elements in accordance with the invention. The application is not limited in terms of a maximum diameter for a tubular sleeve, and the sleeves also do not necessarily need to be circular.

Figure 3:
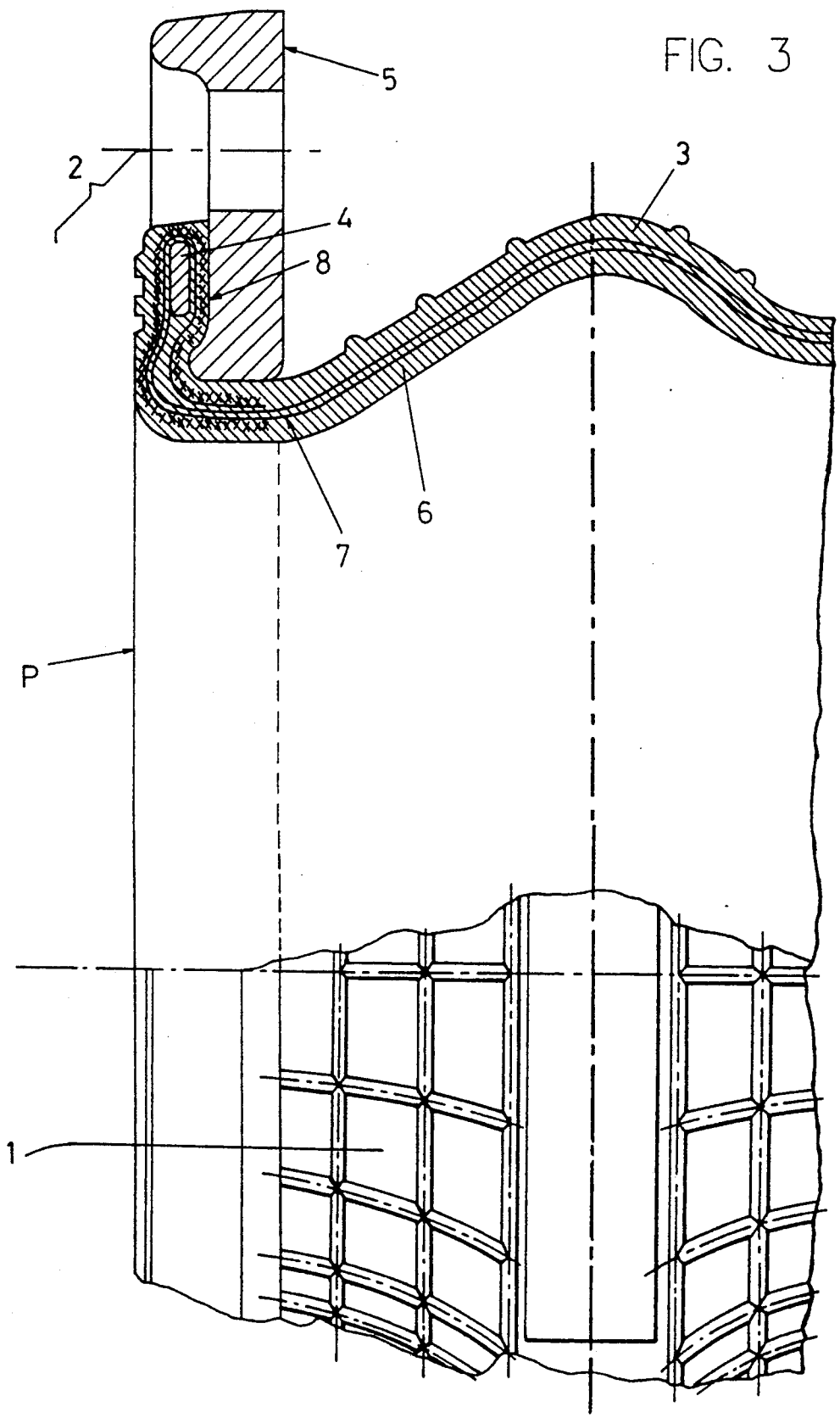
FIG. 3 is a partial cross section through the diameter of an expansion sleeve according to the invention.

The axial cross section shown in FIG. 8a is essentially the same as that shown in FIG. 3, which cross section relates to a sleeve manufactured so as to be circular.

FIG. 8a illustrates the fabrication process of a flexible tubular structure, in a straight-line developed form, i.e., vulcanized by successive passes under a very long press. The flexible tubular structure is generally provided with corrugations and beads, which both can still be realized in the straight-line developed form. FIG. 8b shows a sectional view along the plane Q. The chain, manufactured in the straight-line developed form, is made into an endless loop by bringing together and joining its extremities, which extremities are preferably not covered by beads.

This connection of the extremities can be performed in a joining mold, in which, after the different plies of the cord network 7 are stripped away, one (or more) individual elements 9 may be added to the reinforcement armature 4, as necessary, so as to obtain the desired perimeter. The plies of the cord network 7 can then be re-positioned and a possible addition of material can be carried out to reconstruct the flexible elastomer compound wall 6.

Figure 9:
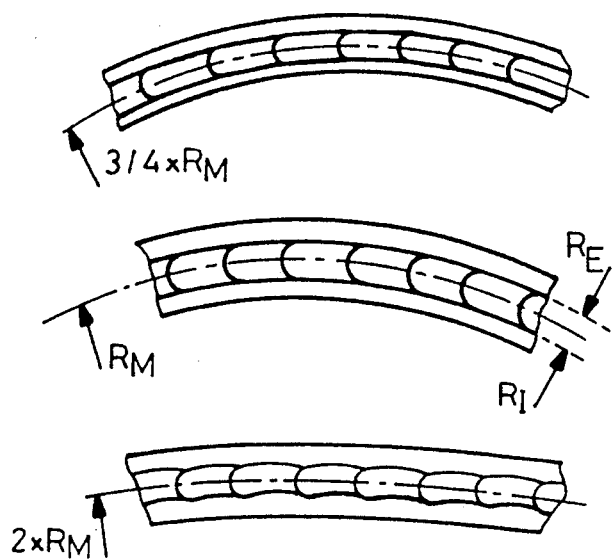
FIG. 9 shows the maximum, average and minimum allowable shapes for the reinforcement bead.

FIG. 9 shows the schematic outlines of the rings used as reinforcement armatures in the minimum, average and maximum diameter flexible tubular structures allowed by this process of closing an articulated reinforcement armature. For example, if the average value of the radius is RM, the minimum value preferably may be on the order of ¾ RM, and the maximum value is on the order of twice RM, for a given range of flexible tubular structures. With reference to FIG. 8a, a good continuity of the envelopment by the plies of the cord network 7 running around the reinforcement armature 4 and folded back over the cord structure 8 requires, during fabrication, even of flat elements, that the reinforcement armature 4 preferably comprises individual elements 9 having a curved profile. In contrast, if these elements had straight profiles, any armature made from such individual elements would be of a polygonal shape.

A nominal average sleeve diameter then preferably corresponds to a continuous curvature along the outside RE and inside RI average radii of the reinforcement armature 4. This curvature is preferably obtained by a slight permanent deformation of the material constituting the sleeve.

In addition, a higher or lower value of this permanent deformation suffices for the realization of sleeves with smaller or larger diameters. In particular, near-zero deformation makes it possible to increase the possibilities of realization in this range up to very large diameters. The investments in fabrication equipment are then significantly reduced in comparison to the requirements of the known art. The slight excrescence 16 given to the cross section of the rigid counterflange 5 preferably eliminates any risk of instability in very large diameters. Such instability may be due to a quasi-, or partially improper alignment, by contact after assembly behind the reinforcement bead 2, when an intense circumferential compression is exerted on the reinforcement armature 4.

In contrast to the flat-strip type pinching systems, the present invention, as a result of the existence of a strong bead which becomes substantially rigid after assembly of the sleeve and counterflanges, makes is possible to use even very large diameters under high pressures. The strength of the centripetal anchoring of the cord network is limited only by the circumferential compression strength of the rigid ring comprising the alignment of the different curved contact surfaces 12 between individual elements 9 within the reinforcement bead. Only when the flexible tube is more than several meters in diameter does this circumferential compression strength conceivably limit the possibility of extending the range into high pressures, since a buckling instability is eliminated by the existence of the slight excrescence 16.

Figure 10:
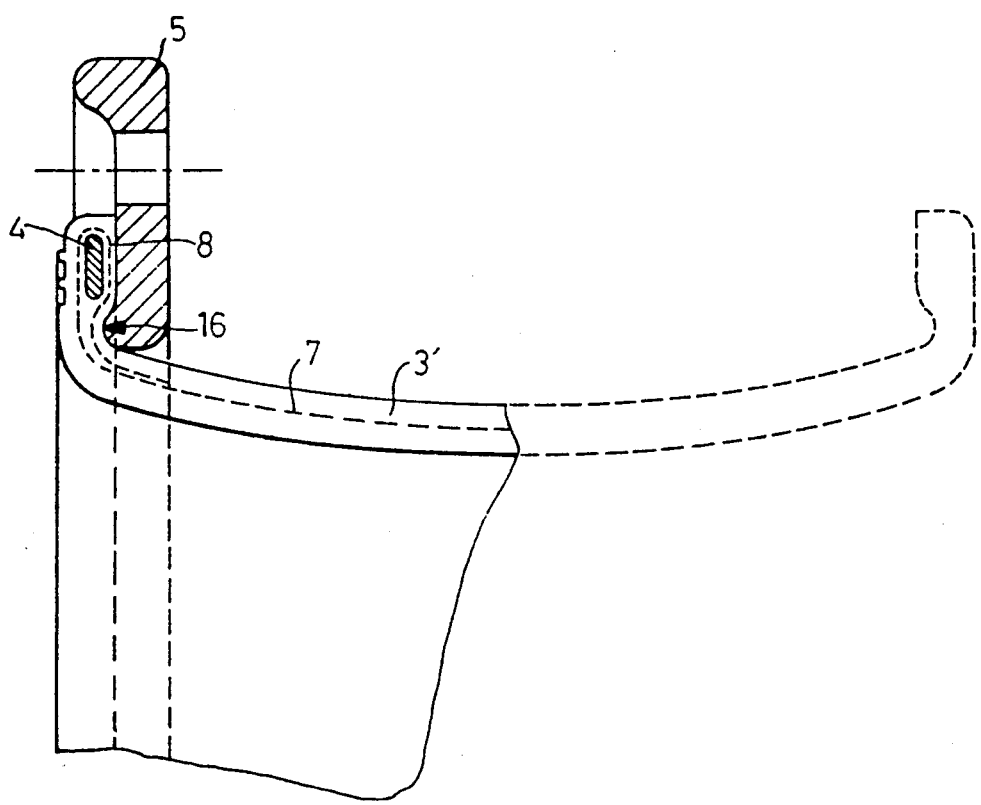
FIG. 10 shows, in a partial axial cross section, the use of the articulated reinforcement bead in a vacuum cuff or sleeve which is required to withstand an external pressure.

FIG. 10 is a partial axial section which illustrates the same technology, with the same references as the description of FIG. 3, but in application to a vacuum cuff, or more generally to a flexible wall sleeve 3' subjected to an exterior overpressure which, in particular applications, may exceed one bar in relation to the pressure of the fluid circulating inside.

The anchoring against the centripetal forces caused by the ascent of the cord structure 8 around the reinforcement armature also allows the cord network 7 to effectively resist the forces experienced by the flexible wall 3' which flexible wall 3' is capable of resisting a large underpressure or a differential pressure greater than 1 bar, regardless of the diameter of the tubular structure.

A very long straight-line mold, whose cross section is shown in this figure, and an appropriate connection mold make it possible to realize vacuum cuffs which are very strong in spite of their large diameter, by virtue of the joining of elements fabricated as straight line shapes.

Here again, the different limits of curvature in a given range, as defined in FIG. 9 for the sleeves subjected to internal pressure, also make possible the constitution of a new line of high-strength vacuum cuffs which are particularly useful in condensers for thermal power plants or in sea water desalination plants, without the requirement for the creation of tools for each desired dimension.

In this case, too, the formation on site into an endless loop allows on-site repair, or the installation around immovable components, as is frequently required in the expansion sleeve industry.

In summary, the technology for the use of the articulated armature for a reinforcement bead according to the invention for the installation of expansion sleeves on their counterflanges or, more generally, for the installation of any flexible tubular structure in contact with the opening of a rigid wall, has the following advantages:

easy assembly, by the distributor for example, which reduces the amount of inventory required in each size for both the counterflanges, which counterflanges can be drilled as required for the different standards, and for the sleeves, which sleeves have different characteristics of resistance to the fluids to be transported, or for example, have different axial lengths and thus different elastic strokes. Since sleeves can be assembled as needed, the storage of numerous combinations of already assembled sleeves is, therefore, unnecessary. Moreover, deliveries to the customer are significantly accelerated if a particular application requires special flanges, since it is no longer necessary to send the sleeves to a fabrication shop.

since several different diameters can be realized from only one type of individual element, the flexibility of the process for constituting the reinforcement armatures significantly reduces the need for intermediate procurement of armatures for beads, and consequently reduces the time required to manufacture custom-fabricated sleeves, as well as sleeves or flanges of non-standard diameters.

the joining of continuous strip makes it possible to fabricate very large sleeves, which need not be circular, and which can nevertheless be used for high pressures, without significant capital investments, as well as to fabricate vacuum cuffs or sleeves for high external pressures.

on-site repair becomes possible, using appropriate equipment, as well as the on-site fabrication of the sleeve around components which cannot be removed or dismantled. Moreover, a finished sleeve can be manipulated, due to its deformability, through a limited passage which is smaller than the diameter of the sleeve.

and finally, the storage of replacement equipment for critical items which must be available on site, is usually infinitely simplified, since the coupling material, which is manufactured in a straight-line form, can be joined into almost any desired length.

In further summary, one feature of the invention resides broadly in an articulated reinforcement armature for reinforcement bead 2 of flexible tubular structure, for being anchored to the opening of a rigid wall or a rotating counterflange, characterized by the fact that the reinforcement armature 4 is constituted by an endless chain of flat individual elements 9. This chain is articulated around axes parallel to the axis of the flexible tubular structure, and is embedded in the flexible elastomer compound wall 3, the endless chain allowing the reinforcement bead 2, by assuming a "kidney" shape, to slide into a hole of diameter D in the rigid wall or rigid counterflange 5 without changing the strength of its radial anchoring after it resumes its circular shape.

Another feature of the invention resides broadly in the reinforcement armature for a reinforcement bead 2, characterized by the fact that the deformation of the reinforcement armature 4 takes place by reciprocal rotation of the male extremities 10 and of the female extremities 11 of individual elements 9, which individual elements 9 have an outside average radius RE and an inside average radius RI and which elements 9 are assembled in the number necessary to form a rigid ring when the armature returns to a circular shape.

Yet another feature of the invention resides broadly in the articulated reinforcement armature for reinforcement bead 2, characterized by the fact that the armature is formed in a polygonal manner by a number of individual elements 9 greater or less than the number required to form a circular rigid ring. The individual elements 9 are in contact with one another by means of a curved surface 12.

A further feature of the invention resides broadly in the articulated reinforcement armature for reinforcement bead 2, characterized by the fact that the articulation between individual elements 9, during the operation of engaging the reinforcement bead 2 in the hole of the diameter D in the rigid counterflange 5, takes place around bosses 14 located on the male extremities 10 and corresponding dimples 15 located on the female extremities 11.

A yet further feature of the invention resides broadly in the articulated reinforcement armature for reinforcement bead 2, characterized by the fact that the individual elements 9 are made of rigid polymer, which may be reinforced by glass fibers, and the deformability of which makes possible the formation of the endless chain by clipping the elements together.

Yet another further feature of the invention resides broadly in the flexible tubular structure anchored to the opening of a rigid wall, including an articulated reinforcement armature 4, characterized by the fact that the individual elements 9 forming the endless chain have a curved profile, and by the fact that the flexible tubular structure comprises a flat developed strip, formed into an endless loop by joining its extremities, which do not have reinforcement beads 2.

An additional feature of the invention resides broadly in the flexible tubular structure including an articulated reinforcement armature 4, characterized by the fact that the anchoring of the flexible wall 3' of the flexible tubular structure allows it to be used with an internal underpressure or an external overpressure.

Art hereby incorporated as reference includes U.S. Pat. Nos. 4,726,609 to Daignot and Roux entitled "Bead Reinforcement with Tubular Structure with Divisible Armature", 4,749,216 to Bechu et al. entitled "Device for Anchoring a Flexible Tubular System on a Rigid Shoulder by means of a Fragmented Armature", and 4,750,763 to Bechu et al. entitled "Device for Anchoring a Flexible Tubular System on a Rigid Shoulder by means of an Armature with Lined Segments".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A kit for making a pipe expansion joint, said kit comprising:

a flexible sleeve having a longitudinal axis;

at least one flange for being disposed about said flexible sleeve, said at least one flange having an orifice portion, said orifice portion comprising an orifice, the orifice having an internal dimension;

means for anchoring said flexible sleeve to said at least one flange;

said means for anchoring comprising a shoulder portion of said flexible sleeve, said shoulder portion having an external dimension, the external dimension of said shoulder portion being greater than the internal dimension of the orifice of said at least one flange;

said shoulder portion comprising a plurality of adjacent, interconnecting elements, each of said interconnecting elements being rotatably connected to its adjacent elements by means for providing rotation so that an axis of rotation of any two adjacent elements is parallel to the longitudinal axis of said flexible sleeve;

said interconnecting elements, said means for providing rotation and said shoulder portion being configured to permit angular movement between said interconnecting elements about their corresponding axes of rotation and thus decrease the external dimension of said shoulder portion to thereby permit insertion of said shoulder portion through the orifice of said at least one flange;

said means for providing rotation comprise pins for being disposed through said adjacent interconnecting elements;

said pins each having a longitudinal axis; and the longitudinal axis of said pins being disposed parallel to the longitudinal axis of said sleeve.

2. The kit for a pipe expansion joint according to claim 1, wherein each of said interconnecting elements comprises:

a first end and a second end disposed away from said first end, said first end comprising a protrusion and said second end comprising a slot means such that said protrusion of each said interconnecting element fits rotatably within and engages with said slot means of an adjacent interconnecting element to thereby form a chain of interconnecting elements.

3. The kit for a pipe expansion joint according to claim 2, wherein:
said protrusion of each said first end further comprises at least one rounded protuberance disposed on said protrusion, said at least one rounded protuberance defining the axis of rotation of said interconnecting elements;
said slot means of said second end comprises at least one rounded depression for receipt of said at least one rounded protuberance; and
said at least one rounded protuberance of each interconnecting element for being engaged with said slot means of an adjacent interconnecting element to thereby maintain said first end of each interconnecting element within said second end of an adjacent interconnecting element.

4. The kit for a pipe expansion joint according to claim 3, wherein:
said interconnecting elements comprise a first planar surface and a second planar surface substantially parallel to said first planar surface, said first planar surface and said second planar surface having a longitudinal axis disposed therebetween; and
said interconnecting elements each comprise a first edge and a second edge, said first edge and said second edge being disposed substantially parallel to the longitudinal axis of said interconnecting element and substantially orthogonal to each of said first and said second planar surfaces, said first edge having a first radius of curvature, and said second edge having a second radius of curvature such that the second radius of curvature is greater than the first radius of curvature.

5. The kit for a pipe expansion joint according to claim 4, wherein:
said chain of interconnecting elements is an endless chain of interconnecting elements;
said endless chain of interconnecting elements comprises a first number of interconnecting elements to thus form a substantially circular endless chain of interconnecting elements;
said substantially circular endless chain of interconnecting elements defines a circle having an internal dimension of two times the first radius of curvature, and an outer dimension of two times the second radius of curvature;
said endless chain of interconnecting elements comprises a second number of interconnecting elements to form a polygonal endless chain of interconnecting elements having an internal dimension greater than two times the first radius of curvature and an external dimension greater than two times the second radius of curvature, said second number of interconnecting elements being greater than said first number of interconnecting elements; and
said endless chain of interconnecting elements comprises a third number of interconnecting elements to form a further polygonal endless chain of interconnecting elements having an internal dimension less than two times the first radius of curvature and an external dimension less than two times the second radius of curvature, said third number of interconnecting elements being less than said first number of interconnecting elements.

6. The kit for a pipe expansion joint according to claim 5, wherein:
said interconnecting elements are constructed of at least one of: metal and rigid polymer, said rigid polymer being reinforceable with glass fibers;
said flexible sleeve is constructed of elastomer compound disposed about a network of cords, the cords of said network of cords being constructed of at least one of: textile or metal;
said elastomer compound is a flat strip of elastomer compound having at least two extreme ends, and said flexible sleeve is constructed by joining said two extreme ends of said flat strip of elastomer compound;
said at least one flange comprises a shoulder adjacent to and completely around the orifice, said shoulder of said at least one flange for engaging and retaining said means for anchoring said sleeve completely around the orifice;
said substantially circular chain of interconnecting elements being deformable into a substantially kidney shaped chain of interconnecting elements; and
said pipe expansion joint being capable of withstanding both high pressure and vacuum.

7. A flexible sleeve for a pipe expansion joint, said flexible sleeve for being disposed within an orifice, the orifice having an internal dimension and the flexible sleeve having a longitudinal axis, said flexible sleeve comprising:
means for anchoring said flexible sleeve to an orifice into which said flexible sleeve is to be disposed;
said means for anchoring comprising a shoulder portion of said flexible sleeve, said shoulder portion having an external dimension, the external dimension of said shoulder portion being greater than the internal dimension of an orifice into which said flexible sleeve is to be disposed;
said shoulder portion comprising a plurality of adjacent, interconnecting elements, each of said interconnecting elements being rotatably connected by means for providing rotation to its adjacent elements so that an axis of rotation of any two adjacent elements is parallel to the longitudinal axis of said flexible sleeve;
said interconnecting elements, aid means for providing rotation and said shoulder portion being configured to permit angular movement between said interconnecting elements about their corresponding axes of rotation and thus decrease the external dimension of said shoulder portion to thereby permit insertion of said shoulder portion through an orifice into which said flexible sleeve is to be disposed;
said means for providing rotation comprise pins for being disposed through said adjacent interconnecting elements;
said pins each having a longitudinal axis; and
the longitudinal axis of said pins being disposed parallel to the longitudinal axis of said sleeve.

8. The pipe expansion joint expansion according to claim 7, wherein each of said interconnecting element comprises:
a first end and a second end disposed away from said first end, said first end comprising a protrusion and said second end comprising a slot means such that said protrusion of each interconnecting element fits rotatably within and engages with said slot means of an adjacent interconnecting element to thereby form a chain of interconnecting elements.

9. The expansion joint according to claim 8, wherein:
said protrusion of each said first end further comprises at least one rounded protuberance disposed on said protrusion, said at least one rounded protuberance defining the axis of rotation of said interconnecting elements;
said slot means of said second end comprises at least one rounded depression for receipt of said at least one rounded protuberance; and
said at least one rounded protuberance of each interconnecting element for being engaged with said slot means of an adjacent interconnecting element to thereby maintain said first end of each interconnecting element within said second end of an adjacent interconnecting element.

10. The pipe expansion joint according to claim 9, wherein:
said interconnecting elements comprise a first planar surface and a second planar surface substantially parallel to said first planar surface, said first planar surface and said second planar surface having a longitudinal axis disposed therebetween; and
a first edge and a second edge of said interconnecting elements are disposed substantially parallel to said longitudinal axis of said interconnecting element and substantially orthogonal to each of said first and second planar surfaces, said first edge having a first radius of curvature, and said second edge having a second radius of curvature such that said second radius of curvature is greater than said first radius of curvature.

11. The pipe expansion joint according to claim 10, wherein:
said chain of interconnecting elements is an endless chain of interconnecting elements;
said endless chain of interconnecting elements comprises a first number of interconnecting elements to thus form a substantially circular endless chain of interconnecting elements;
said substantially circular endless chain of interconnecting elements defines a circle having an internal dimension of two times said first radius of curvature, and an outer dimension of two times said second radius of curvature;
said endless chain of interconnecting elements comprises a second number of interconnecting elements to form a polygonal endless chain of interconnecting elements having an internal dimension greater than two times said first radius of curvature and an external dimension greater than two times said second radius of curvature, said second number of interconnecting elements being greater than said first number of interconnecting elements; and
said endless chain of interconnecting elements comprises a third number of interconnecting elements to form a further polygonal endless chain of interconnecting elements having an internal dimension less than two times said first radius of curvature and an external dimension less than two times said second radius of curvature, said third number of interconnecting elements being less than said first number of interconnecting elements.

12. The pipe expansion joint according to claim 11, wherein:
said interconnecting elements are constructed of at least one of: metal and rigid polymer, said rigid polymer being reinforceable with glass fibers;
said flexible sleeve is constructed of elastomer compound disposed about a network of cords, the cords of said network of cords being constructed of at least one of: textile or metal;
said elastomer compound is a flat strip of elastomer compound having at least two extreme ends, and said flexible sleeve is constructed by joining said two extreme ends of said flat strip of elastomer compound;
the orifice is completely surrounded by a shoulder portion, the shoulder portion being for engaging and retaining said means for anchoring said flexible sleeve completely around the orifice into which said flexible sleeve is to be disposed;
said substantially circular chain of interconnecting elements being deformable into substantially kidney shaped chain of interconnecting elements; and
said pipe expansion joint being capable of withstanding both high pressure and vacuum.

13. A means for anchoring a flexible sleeve of a pipe expansion joint within an orifice, said flexible sleeve having a longitudinal axis, the orifice having an internal dimension, said means for anchoring comprising:
a shoulder portion of said flexible sleeve, said shoulder portion having an external dimension, the external dimension of said shoulder portion being greater than the internal dimension of the orifice;
said shoulder portion comprising a plurality of adjacent, interconnecting elements, each of said interconnecting elements being rotatably connected by means for providing rotation to its adjacent elements so that an axis of rotation of any two adjacent elements is substantially parallel to the longitudinal axis of said flexible sleeve;
said interconnecting elements, said means for providing rotation and said shoulder portion being configured to permit angular movement between said interconnecting elements about their corresponding axes of rotation and thus decrease the external dimension of said shoulder portion to thereby permit insertion of said shoulder portion through the orifice;
said means for providing rotation comprise pins for being disposed through said adjacent interconnecting elements;
said pins each having a longitudinal axis; and
the longitudinal axis of said pins being disposed parallel to the longitudinal axis of said sleeve.

14. The means for anchoring according to claim 13, wherein each of said interconnecting elements comprises:
a first end and a second end disposed away from said first end, said first end comprising a protrusion and said second end comprising a slot means such that said protrusion of each said interconnecting element fits rotatably within and engages with said slot means of an adjacent interconnecting element to thereby form a chain of interconnecting elements.

15. The means for anchoring according to claim 14, wherein:
said protrusion of each said first end further comprises at least one rounded protuberance disposed on said protrusion, said at least one rounded protuberance defining the axis of rotation of said interconnecting elements;

said slot means of said second end comprises at least one rounded depression for receipt of said at least one rounded protuberance; and said at least one rounded protuberance of each interconnecting element for being engaged with said slot means of an adjacent interconnecting element to thereby maintain said first end of each interconnecting element within said second end of an adjacent interconnecting element.

16. The means for anchoring according to claim 15, wherein:

said interconnecting elements comprise a first planar surface and a second planar surface substantially parallel to said first planar surface, said first planar surface and said second planar surface having a longitudinal axis disposed therebetween; and a first edge and a second edge of each said interconnecting element are disposed substantially parallel to said longitudinal axis of said interconnecting element and substantially orthogonal to each of said first and second planar surfaces, said first edge having a first radius of curvature, and said second edge having a second radius of curvature such that said second radius of curvature is greater than said first radius of curvature.

17. The means for anchoring according to claim 16, wherein:

said chain of interconnecting elements is an endless chain of interconnecting elements;

said endless chain of interconnecting elements comprises a first number of interconnecting elements to thus form a substantially circular endless chain of interconnecting elements;

said substantially circular endless chain of interconnecting elements defines a circle having an internal dimension of two times said first radius of curvature, and an outer dimension of two times said second radius of curvature;

said endless chain of interconnecting elements comprises a second number of interconnecting elements to form a polygonal endless chain of interconnecting elements having an internal dimension greater than two times said first radius of curvature and an external dimension greater than two times said second radius of curvature, said second number of interconnecting elements being greater than said first number of interconnecting elements;

said endless chain of interconnecting elements comprises a third number of interconnecting elements to form a further polygonal endless chain of interconnecting elements having an internal dimension less than two times said first radius of curvature and an external dimension less than two times said second radius of curvature, said third number of interconnecting elements being less than said first number of interconnecting elements;

said interconnecting elements are constructed of at least one of: metal and rigid polymer, and rigid polymer being reinforceable with glass fibers;

said flexible sleeve is constructed of elastomer compound disposed about a network of cords, the cords of said network of cords being constructed of at least one of: textile or metal.

said elastomer compound is a flat strip of elastomer compound having at least two extreme ends, and said flexible sleeve is constructed by joining said two extreme ends of said flat strip of elastomer compound;

the orifice is completely surrounded by a shoulder portion, the shoulder portion being for engaging and retaining said means for anchoring said sleeve completely around said orifice;

said substantially circular chain of interconnecting elements being deformable into a substantially kidney shaped chain of interconnecting elements; and said pipe expansion joint being capable of withstanding both high pressure and vacuum.

* * * * *

UNITED STATES PATENT AND TRADEMARK OFFICE
CERTIFICATE OF CORRECTION

PATENT NO. : 5,174,613

DATED : December 29, 1992

INVENTOR(S) : Roland JOUG

It is certified that error appears in the above-identified patent and that said Letters Patent is hereby corrected as shown below:

In column 1, line 43, after 'to', delete "Barghofer," and insert --Berghofer,--.

In column 14, line 46, Claim 7, after 'elements', delete "aid" and insert --said--.

In column 15, line 3, Cliam 9, after 'The', insert --pipe--.

Signed and Sealed this

Nineteenth Day of April, 1994

Attest:

BRUCE LEHMAN

*Attesting Officer*    *Commissioner of Patents and Trademarks*